(No Model.) 3 Sheets—Sheet 1.

A. H. DICKINSON & H. J. FISHER.
LOCK FOR CYCLES.

No. 591,823. Patented Oct. 19, 1897.

WITNESS:
H Richard Wobse
Otto Ulinck

INVENTORS:
Arthur Henry Dickinson
Henry James Fisher
by Richard R
Attys (No Model.) 3 Sheets—Sheet 2.

A. H. DICKINSON & H. J. FISHER.
LOCK FOR CYCLES.

No. 591,823. Patented Oct. 19, 1897.

WITNESS:

INVENTORS:
Arthur Henry Dickinson
Henry James Fisher (No Model.) 3 Sheets—Sheet 3.

A. H. DICKINSON & H. J. FISHER.
LOCK FOR CYCLES.

No. 591,823. Patented Oct. 19, 1897.

WITNESS:

INVENTORS:
Arthur Henry Dickinson
Henry James Fisher
by Richard S.
Attys

UNITED STATES PATENT OFFICE.

ARTHUR HENRY DICKINSON, OF BROCKLEY, AND HENRY JAMES FISHER, OF LONDON, ENGLAND.

LOCK FOR CYCLES.

SPECIFICATION forming part of Letters Patent No. 591,823, dated October 19, 1897.

Application filed February 3, 1897. Serial No. 621,812. (No model.)

*To all whom it may concern:*

Be it known that we, ARTHUR HENRY DICKINSON, residing at 216 Malpas Road, Brockley, and HENRY JAMES FISHER, residing at 102 Shooter's Hill Road, Blackheath, London, county of Kent, England, subjects of the Queen of Great Britain and Ireland, have invented certain new and useful Improvements in Locks for Cycles and in Clips for Affixing Same Thereto, of which the following is a specification.

Our present invention relates to certain improvements upon the cycle-locks described in United States Patent of April 13, 1897, No. 580,661, granted to Arthur H. Dickinson and H. J. Fisher; and it consists in details of construction and combinations which are particularly applicable to cycle-locks of the kind referred to that are fixed to the lower rear stay-tubes of cycles and when shot engage the sprocket or chain wheel and can only be retracted and unlocked by a special key.

The objects of our invention are to provide, first, better kinds of clips for securing the lock-casing to the stay-tubes which will be applicable to all kinds and sizes of cycle-frame tubes without drilling or alteration, and whereby the whole appliance can be readily attached to and removed from the stay-tubes, but only when the locking-bolt is retracted, and, second, to improve and strengthen the locking appliance itself and to render picking or forcing impossible and the whole appliance thoroughly secure against fraudulent operation or removal. These improvements we will describe in reference to the drawings.

Figure 1:
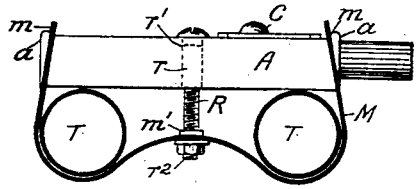
Figure 2:
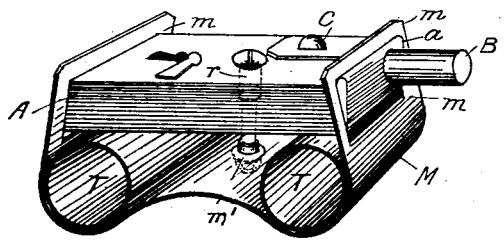
Figure 8:
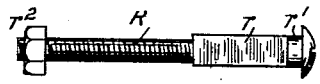
Figure 6:
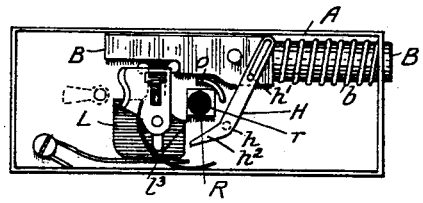
Figure 7:
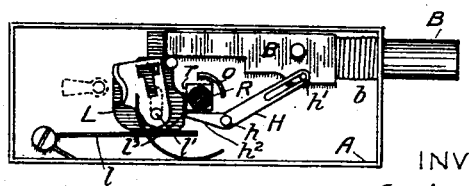
Figure 3:
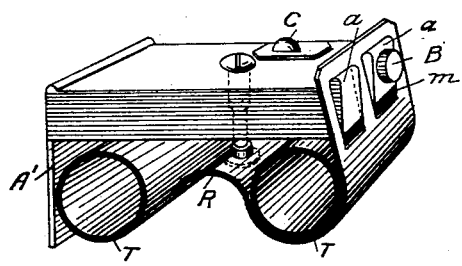
Figure 4:
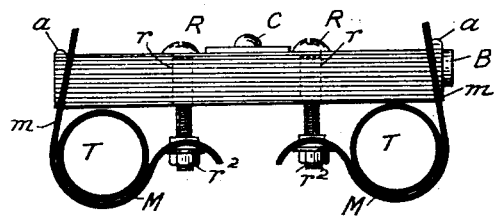
Figure 5:
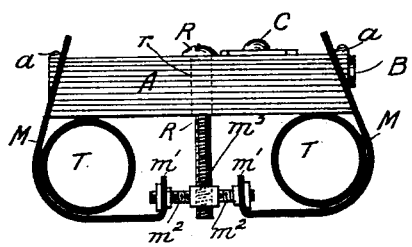
Figure 9:
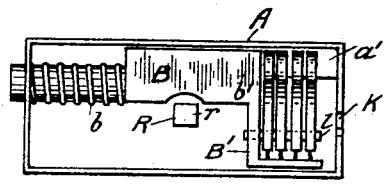
Figure 10:
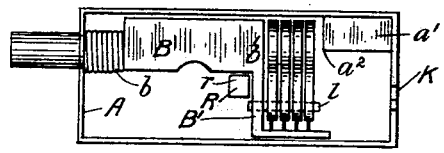
Figures 11, 12:
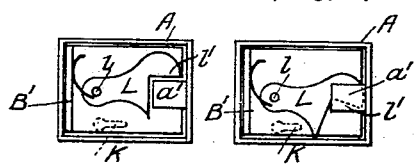

Figure 1 is a cross-section, and Fig. 2 a perspective view showing one form of improved clip. Fig. 3 is a perspective view of a modified form of clip. Figs. 4 and 5 are cross-sections of two other modified arrangements of clips with casings secured thereto and to cycle-frame tubes. Figs. 6 and 7 are internal views showing improved locking arrangements, and Fig. 8 shows the new securing screw-bolt. Figs. 9 and 10 are internal views of a new arrangement of locking-bolt and lock, showing bolt withdrawn and shot; and Figs. 11 and 12 are internal end views showing the lock-levers hereinafter explained.

Referring first to Figs. 1 and 2, we make the clip M of flexible metal of the form shown partly encircling the two frame-tubes T T and with openings $m$ in each of its inwardly-inclined ends. The lock-case A rests on the tubes T T and has an upwardly-projecting ledge $a$ at each end. A collar $m'$, with internal screw threaded to receive the screw-bolt R, is rigidly fixed by soldering, brazing, riveting, or other means into a square or suitable hole in the clip M. The clip M is secured by the screw-bolt R, which passes through the lock-casing and has a square at $r$ and a circular recess at $r'$. To fix the appliance, the spring-clip M is placed around the tubes T T and the projections $a\ a$ of the casing passed through the openings $m\ m$. Then the screw-bolt is inserted through the center hole of the lock-case and screwed tightly up into the collar $m'$ of clip M, thus drawing up the clip tightly around the tubes T T and tightening the grip of the ends of clip $m$ inside the ledges $a$. The ends $m$ of clip M then cannot possibly slip off and the lock is securely fixed. The nut $r^2$ is then screwed up under collar $m'$. The object of the square part $r$ on the screw R is as follows: It will be seen that this comes within the casing, and when the bolt B is retracted, as in Fig. 6, the square $r$ is clear of all parts and the screw R can be turned and the whole removed if desired; but when the bolt B is shot as in Fig. 7, then the tumbler L moves behind the bolt B by the action of its spring $l$, and the side $l^3$ of tumbler L comes against one side of the square $r$ of bolt R, and therefore the screw R cannot be turned or moved in any way until the bolt B has been retracted, and since this can only be effected by a special key it will be obvious that perfect security against fraud is assured. Adjacent to the square $r$ within the case we provide a vertical guard-plate O for giving greater vertical strength to the middle part of the lock-case, preventing bending, and still further obviating removal of the holding-bolt R even if great force be applied in attempting to unscrew it.

To still further strengthen the fastening, we may in some cases provide the auxiliary internal lever H, centered at $h$ on the lock-case and having a pin-and-slot connection at its end $h'$ with the bolt B. When the bolt B is retracted by its spring $b$, as in Fig. 6, the lever H lies in the position therein shown, but when the bolt is shot by operation of the knob C, as in Fig. 7, then the end $h^2$ of lever H engages the flat $l^3$ of the spring-tumbler L and serves to relieve strain upon the center pin $l'$ of the spring-tumbler L and to augment the strength of the whole appliance, as will be readily understood on examination of the figures. The appliance can thus only be removed when unlocked, and is absolutely secure against removal when locked.

The spacing apart of the lower rear frame-tubes varies somewhat in different machines. We have therefore devised the forms illustrated in cross-section in Figs. 3, 4, and 5.

In Fig. 3 the case A has two ledges $a\ a$ at one end only, and a permanently-fixed depending plate A' at the other end which presses against the frame-tube T. To the case is fixed by the screw R, as above described, a half-clip M with two slots $m\ m$ engaging the ledges $a\ a$, the whole being arranged and fixed as shown.

Fig. 4 shows a construction in which two separated half-clips M M are provided, each fixed to the casing A and tubes T T by the screws R R, and constructed and arranged as shown.

In Fig. 5 the clip is in two parts M M, each flanged up inwardly at $m'\ m'$ and connected by one right and left hand adjusting-screw $m^2$ having a center boss or nut $m^3$ with a hole through it. After the clip is applied to the tubes T T, the casing A is placed in position, the ends of clip M are passed over ledges $a$ of lock-casing A, and the clip is then tightened by screwing up the double-handed screw $m^2$. The bolt R is then screwed into the boss $m^3$.

In all cases the tension upon clip M draws the ends of clip M inside the ledges $a$, so that it cannot slip off casing, and thus the lock is securely held. When the bolt B is retracted—that is, when the lock is not in use—the bolt R can be unscrewed and the lock detached, but when bolt B is shot and the lock in use, the bolt R cannot be unscrewed and therefore the lock cannot be detached.

Referring now to the improved construction of lock shown in Figs. 9 to 12, the object of the form adopted is, first, by providing more levers give greater scope for permutations of keys and hence less liability to one key fitting any other lock; and, second, to make the bolt B itself engage the square $r$ on the securing screw-bolt R and prevent its being turned when the bolt is shot and the machine locked. The bolt B is made of the form shown with an angled-L extension B', to which any desired number of spring-pressed lock-levers L are pivoted at $l$, so as to move with the bolt B. The levers L are of shapes such as are shown in Figs. 11 and 12, each differing to accommodate different keys. When the bolt is retracted, as in Fig. 9, the notched ends $l'$ are held up by and rest on a shelf $a'$, fixed within the casing A. When the bolt is shot forward by mechanism such as we have fully described in our original patent, all these levers L move forward with it and clear the shelf $a'$, taking the position shown in Figs. 10 and 12— i. e., behind its inner end $a^2$—so that the bolt cannot be forced back and can only be retracted by use of its special key. In this position the angle $b'$ of the bolt B engages the square $r$ of the bolt R, as will be seen, thereby preventing its being turned or moved while the bolt is shot. The keyhole K is formed at the end of the casing, and the wards of the key are such as to raise all the levers L until they clear the shelf $a'$, and then the bolt B is retracted by its spring $b$, leaving the square $r$ clear. We have not in these figures shown any of the lock mechanism beyond what is new, since what we have already described is applicable.

Having now described our invention, what we claim as new, and desire to secure by Letters Patent, is—

1. The improved clips for fixing a cycle-lock casing to the lower stay-tubes consisting of the combination with a cycle-lock and its casing of a flexible metal strap bent to the form shown at M so as to partly encircle the tubes T T and fixed to the lock-casing by a screw-bolt R passing through same and having an opening $m$ in each end adapted to be sprung over and firmly grip projecting ledges $a$ formed on either end of the lock-casing A, substantially as described.

2. In combination with the frame part, the lock-case having the projection $a$ at its end, a clip extending around the frame part and having an upturned end with a slot therein fitting over the projection with means for securing the clip to the frame part, substantially as described.

3. In combination the lock-case, the locking mechanism therein, a clip for holding the locking-case to the frame part, a screw for securing the clip, said screw having a portion projecting into the lock-case to be engaged and held from turning by a portion of the mechanism, substantially as described.

4. In combination the frame part, the locking-casing, the clip connecting the casing with the frame part, and the screw extending from the clip through the lock-casing to hold the casing, clip and frame part together, said screw having a square portion and the lock having a portion to engage therewith and prevent turning while the bolt is shot, substantially as described.

5. In combination in a lock, the casing, the screw for holding the casing in place and means for preventing turning of the screw-bolt R when the bolt B is shot, but releasing same when the bolt is retracted, consisting of a square portion $r$ formed on the screw-bolt R within the lock-casing, and adapted to engage a flat portion $l^3$ formed on the spring-tumbler L on shooting the bolt B, but released when the tumbler is returned.

6. In combination in a lock, the locking mechanism, the casing, the holding device and means for preventing movement of the holding device consisting of the locking-lever H connected with the locking mechanism to be set thereby, substantially as described.

In testimony whereof we have hereunto set our hands in presence of two witnesses.

ARTHUR HENRY DICKINSON.
HENRY JAMES FISHER.

Witnesses to the signature of Arthur Henry Dickinson:
GEO. J. B. FRANKLIN,
FRED C. HARRIS.

Witnesses to the signature of Henry James Fisher:
HENRY A. PRYER,
FRED C. HARRIS.